United States Patent [19]
Brandt et al.

[11] Patent Number: 5,844,800
[45] Date of Patent: Dec. 1, 1998

[54] SHOT-ROCK DIGGABILITY MONITOR

[75] Inventors: Everett G. Brandt, Brimfield; William C. Evans, Metamora, both of Ill.

[73] Assignee: Caterpillar Inc., Peoria, Ill.

[21] Appl. No.: 769,282

[22] Filed: Dec. 18, 1996

[51] Int. Cl.$^6$ .................................................. G06F 19/00
[52] U.S. Cl. .................... 364/468.03; 299/13; 702/174; 364/400
[58] Field of Search .................. 364/400, 468.03, 364/468.01; 701/50; 702/2, 129, 174, 182, 183, 84, 81; 299/13, 1.05; 177/139

[56] References Cited

U.S. PATENT DOCUMENTS 4,919,222 4/1990 Kyrtoss et al. ......................... 177/139

OTHER PUBLICATIONS

Blast Optimization through Performance Monitoring of Drills & Shovels, J. Peck, C.Hendricks,M.Scoble, McGill University, pp. 159–166 1990.

Hendricks,Peck,Scoble – An Automated Approach to Blast Optimization through Performance Monitoring of Blast Hole Drills & Mining Shovels Jun. 1992.

*Primary Examiner*—Reba I. Elmore
*Assistant Examiner*—Steven R. Garland
*Attorney, Agent, or Firm*—Al Crowder; Steven G. Kibby

[57] ABSTRACT

Method and Apparatus are disclosed for dynamically determining the efficiency of blast design parameters at a mine site from measured machine loader characteristics whereby a microprocessor system receives signals indicative of power train and work implement linkage measurements and develops diggability ratio indices therefrom to ascertain the blast design efficiency.

16 Claims, 4 Drawing Sheets

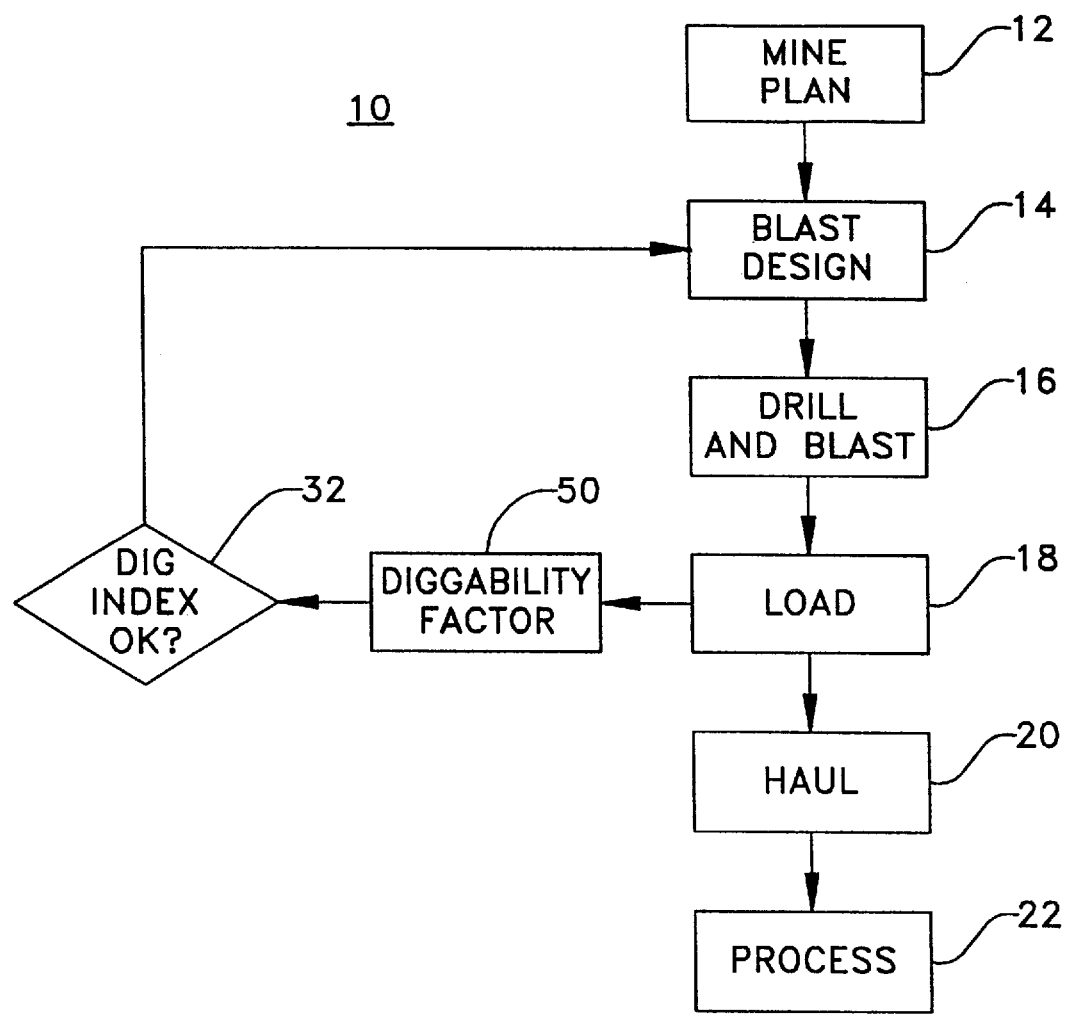
Fig_1_

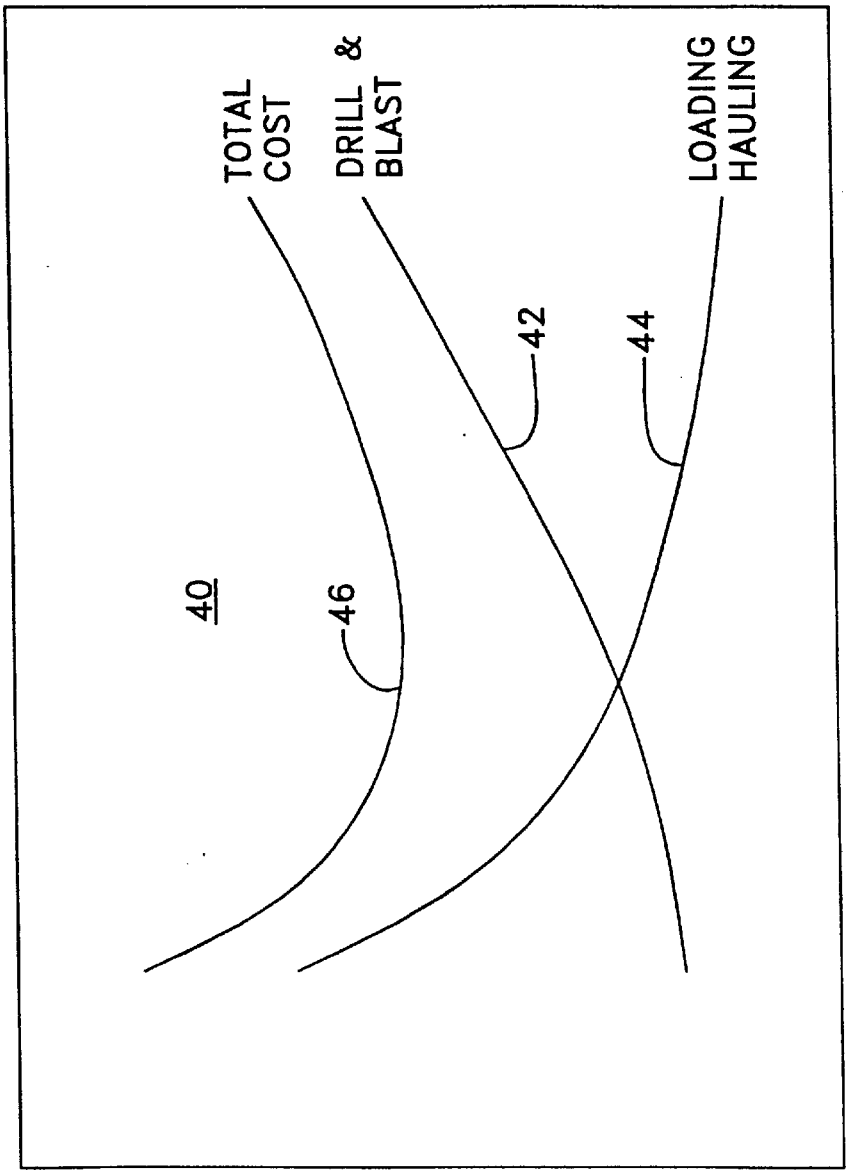

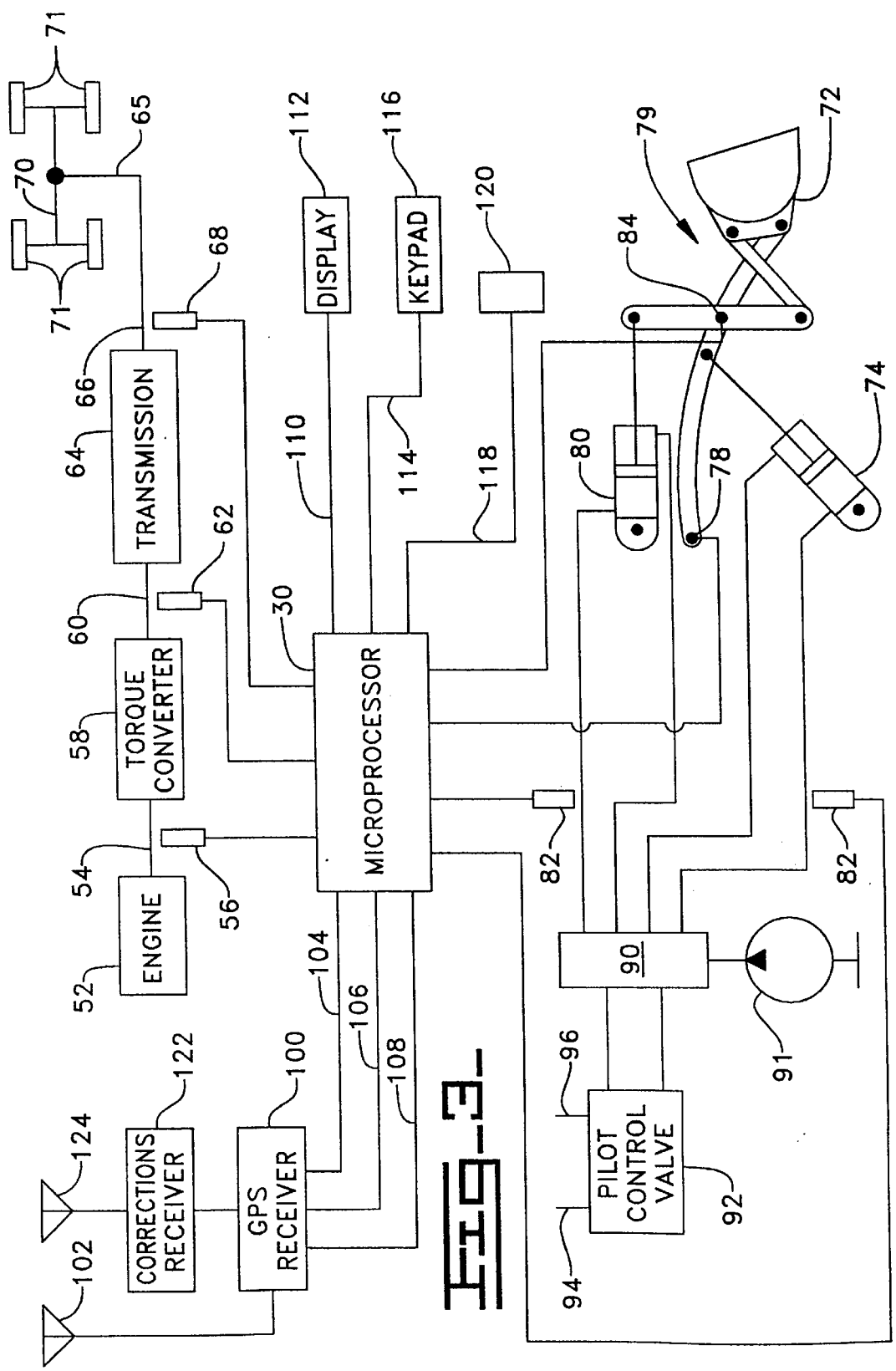
FIG_3

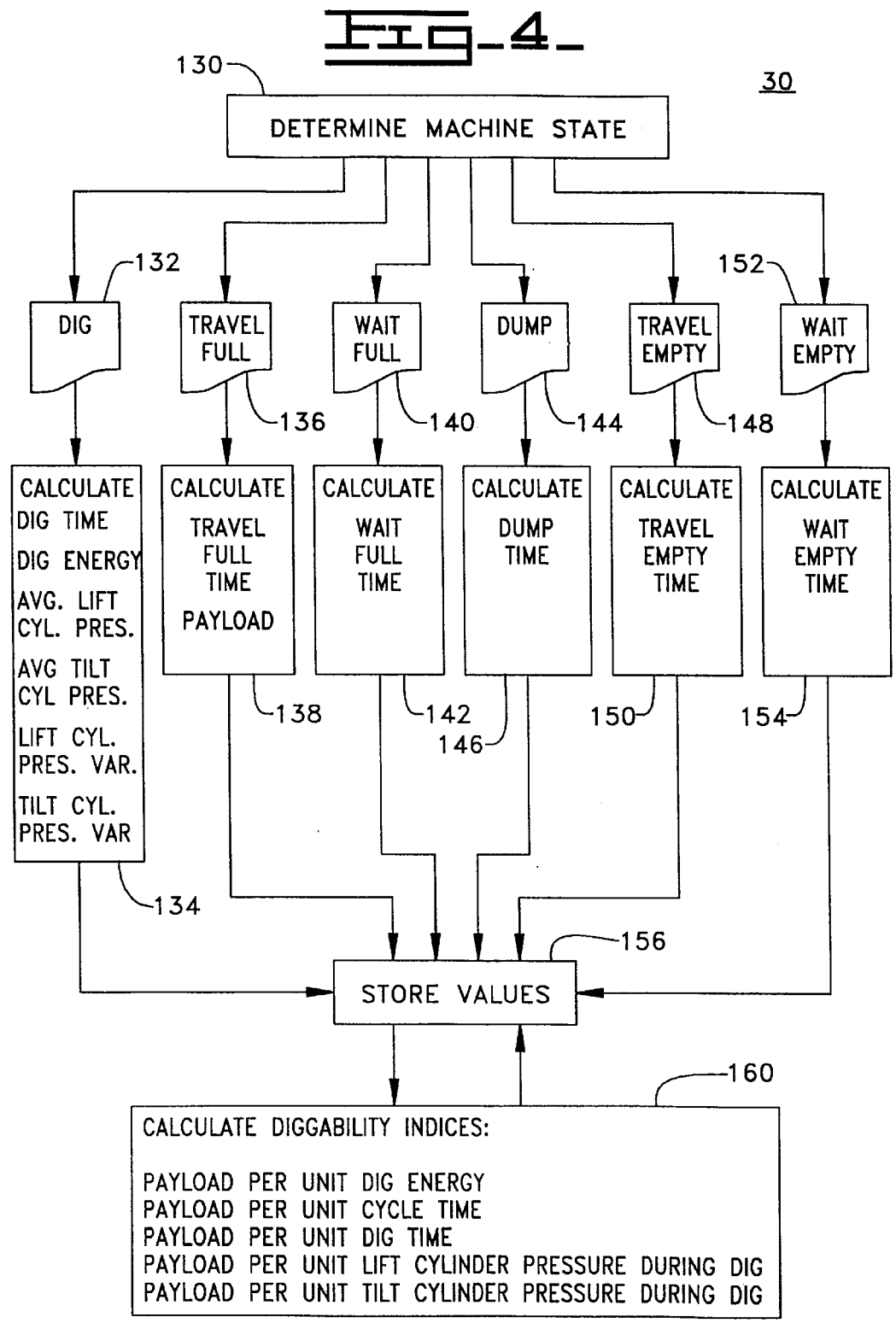

SHOT-ROCK DIGGABILITY MONITOR

TECHNICAL FIELD

This invention relates generally to a monitoring system for automatically acquiring and processing machine operating parameter data and, more particularly, to a method and apparatus for non-obtrusively acquiring and processing machine operation data to quantify the digging conditions for blast design assessment.

BACKGROUND ART

In a mining operation, a critical element of productivity is the blast design wherein a blast engineer prepares a blast hole diagram for the site, drills and charges the blast holes with an explosive charge, detonates the charge and reduces the site material into broken rock pieces known as shot-rock. The shot-rock thus obtained form what is generally referred to as a muckpile. The material is then typically loaded onto a truck for processing or removal by digging into the muckpile with the bucket of an earthmoving machine.

Many factors affect the digging characteristics of the shot-rock muckpile including rock fragmentation, void ratio or heave, and shape of the shot material. Accordingly, when planning a shot, the blast engineer must choose a blast hole pattern, hole diameter, explosive type, etc., to adequately fracture the rock and heave the muckpile. If the shot is too light, shot-rock may be too blocky or stay keyed together and be difficult to load, resulting in reduced productivity and higher loading and hauling costs. Owning and operating costs may also rise due to increased bucket wear and shortened machine life due to higher structural loading on the bucket and loading mechanism.

Decreasing the blast hole spacing may improve material fragmentation and increase machine productivity, but increases drilling and blasting costs. Other costs associated with processing material must also be considered. For example, if the shot-rock material will be crushed, then some of the added drill and blast costs may be offset by reduced crushing costs. However, a point will eventually be reached where additional fragmentation will cost more than it will save.

In the prior art, manual fragmentation measurements of the shot-rock muckpile, such as by sieving, were used to establish the material size distribution, without any defined relationship between fragmentation and ease of loading. Further, a drawback of such measurement is that fragmentation measurement is difficult and time consuming and does not account for heave or void ratio, which can also affect loading difficulty.

Additionally, photo-analysis methods have been used for determining muckpile fragmentation. These methods, while less time-consuming and more practical than manual sieving, have the disadvantage of only being able to ascertain what is on the surface of the muckpile and the inherent difficulty of defining 3-dimensional fragments from 2-dimensional images.

It is therefore an object of the present invention to provide for measuring the digging conditions of the shot-rock muckpile that is non-intrusive, that is, there is no need to stop production while data is being collected.

It is another object of the present invention to provide immediate feedback of results of the shot-rock so that changes in blasting technique, bore hole spacing, etc. can be timely made to optimize the same.

It is still a further object of the invention to provide an accurate overall assessment of the shot-rock muckpile at the mining site to ascertain the material to be handled by the loader.

DISCLOSURE OF THE INVENTION

The present invention overcomes the difficulties of the prior art by measuring the shot-rock muckpile condition, using the loading machine parameters to quantify the digging conditions, thereby determining material diggability indices. The material diggability indices can then be used to ascertain the digging conditions and quantify the benefits of changing the blast design. Accordingly, the present invention is directed to overcoming the problems as set forth above.

The present invention is directed to using machine data, such as lift and tilt cylinder pressures and displacements during the dig part of the work cycle to quantify digging conditions.

Further use of the data developed by the present invention is to enable computation of the muckpile centroid location. This is useful when the blast is designed to heave or cast the shot-rock material in a particular manner or direction.

BRIEF DESCRIPTION OF THE DRAWINGS

For a better understanding of the present invention, references may be made to the accompanying drawings in which:

FIG. 1 is a block diagram of a mining system incorporating the diggability monitor of the present invention;

FIG. 2 is a graph showing the optimization of unit cost versus diggability index;

FIG. 3 is a diagrammatic representation of a wheel loader incorporating the diggability monitor of the present invention; and FIG. 4 is a state transition diagram of the diggability monitor of the present invention.

BEST MODE FOR CARRYING OUT THE INVENTION

Referring now to FIG. 1, a mining system 10 generally incorporates a mine plan 12 setting out the area to be mined as well as soil parameters, conditions, etc. Generally, the mine plan incorporates blasting to reduce the mineral and rock formations to a shot-rock muckpile which may be readily loaded and transported for further processing.

Accordingly, the blast engineer designs a blast pattern to be utilized in reducing the material in the blast area to such a muckpile. The blast design 14 is generally optimized to permit ease of loading and reduce wear and tear on the machinery. Next, the blast pattern is drilled, the holes loaded with explosives, and the charges detonated 16 to reduce the material to the desired shot-rock size. Thereafter, machinery is employed to load 18 the muckpile for transportation 20 to be processed 22. By way of example only and not by way of limitation, the present invention can improve utilization of hydraulic wheel and track-type loaders to remove the blast material to a hauling truck or processing location.

In the present invention, a microprocessor is integrated into a loader to utilize machine data such as lift and tilt cylinder pressures and displacement during the dig parts of the cycle to quantify the digging conditions. This approach has several advantages. First, it is not intrusive, that is, there is no need to stop production while data is being collected. Secondly, it provides immediate feedback to the blasting contractor so that changes in blasting technique, bore hole spacing, etc. can be made as early as possible. Finally, it provides an assessment of diggability based on all the material in the pile, since the loader has to handle every cubic yard of material which the blast reduces into the muckpile.

The present invention is occasioned by the many factors affecting the digging characteristics of shot-rock, including rock fragmentation, void ratio or heave, and shape of the shot material. When planning a shot, the blast engineer must prepare a Blast Design 14 in which a blast hole pattern is chosen, hole diameter, explosive type, etc. are selected to adequately fracture the rock and heave the muckpile.

Referring now to FIG. 2, there is shown a graph 40 indicating drill and blast costs 42 compared to loading and hauling costs 44 to produce a total cost curve 46. Thus, if the shot is too light, the shot-rock may be too blocky or stay keyed together and be difficult to load, resulting in reduced productivity and higher loading and hauling costs. Owning and operating costs may also rise due to increased bucket wear and short machine life due to higher structural loads. Decreasing the blast hole spacing may improve material fragmentation and increase productivity, but increases drilling and blasting costs. Other costs associated with processing material must also be considered. For example, if the shot material will be crushed, then some of the added drill and blast costs may be offset by reduced crushing costs. However, as shown in total cost curve 46, a point will be reached where additional fragmentation will cost more than it will save.

Referring now to FIG. 3, a shot-rock diggability monitor of the present invention is incorporated into a machine loader and is built around a microprocessor 30 which incorporates measured parameters of the operating machinery for determining the digging characteristics of the material by using the loader machine power train and work implement linkage measurements. Along with microprocessor 30, the monitor system of the present invention includes signal conditioners that filter incoming data signals, with microprocessor 30 providing internal timing, internal memory, data connection ports, data acquisition ports, a display 112, and a data entry device 116.

The diggability monitor 50 is utilized on a digging machine, such as a loader, through various sensors attached to at least a power train 70 incorporating an engine 52, a torque converter 58, and a transmission 64 and coupled to receive the output of the sensors. The digging machine transmission 64 is connected to drive rotatable elements such as tracks or wheels 71 through a hydraulic or mechanical linkage 65 which provide machine propulsion.

A control circuit 90 includes a hydraulic pump 91, and operates hydraulic actuators 74,80, and a mechanical linkage 79 which is connected to a loader bucket 72. The hydraulic pump 91 provides fluid flow through the hydraulic actuators 74,80 which move the bucket 72 through the material pile.

An engine speed sensor 56 senses the output speed of the engine 52 and produces an engine speed signal. A torque converter speed sensor 62 senses the output speed of the torque converter 58 and produces a torque converter speed signal. A transmission state sensor 68 senses the gear and direction of rotation (forward, neutral, or reverse) of the transmission 64 and produces a transmission state signal. A lift cylinder pressure sensor senses the pressure in the bucket lift cylinder 74 and produces a lift cylinder pressure signal. A lift arm angle sensor 78 senses lift arm movement and produces a lift arm angle signal. A tilt cylinder pressure sensor 82 senses the pressure in the bucket tilt cylinder 80 and produces a tilt cylinder pressure signal. A tilt lever angle sensor 84 senses the tilt lever movement and produces a tilt lever signal. In an alternative method, lift and tilt arm angles can be determined by sensing the extension of the lift and tilt cylinders, 74,80, respectively. Examples of cylinder extension sensors include, but are not limited to, RF sensors, resolvers, and the like.

Although not an essential element of the present invention, use of a Global Positioning System (GPS) receiver 100 assists in performing the calculations relating to the location of the loader with respect to the mine site to assist in determining the dispersion of the shot-rock muckpile. While the location of the digging machine can be ascertained by visual means, the provision of the location via the GPS receiver 100 provides more precise information directly to the microprocessor 30, removing the need for manual entry of that data. Accordingly, a GPS receiver 100 senses machine position with respect to the mine site and produces X, Y, Z machine position signals. It is known in the art that a separate Global Positioning System receiver 122 that is stationary with respect to the mine site can be used to provide correctional signals to the on-board GPS receiver 100 used by the loader diggability monitor system 50. Both receivers, 100,122 receive GPS position data through antennas 102,124 respectively.

Referring still to FIG. 3 and also to FIG. 4, the microprocessor 30 receives the above-described sensor signals and processes them to determine the machine's state of operation which states may be referred to as DIG 132, TRAVEL-FULL 136, WAIT-FULL 140, DUMP 144, TRAVEL-EMPTY 148, and WAIT-EMPTY 152. Further, following the DIG 132 portion of each cycle and through the TRAVEL-FULL 136 and WAIT-FULL 140 portions of each cycle, the payload carried by bucket 72 is determined by processing the lift cylinder pressure signal and lift arm angle signal as more fully described in U.S. Pat. No. 4,919,222, entitled DYNAMIC PAYLOAD MONITOR. A signal representing the payload in the bucket 72 is then stored in the internal memory of the microprocessor 30. Accordingly, one or more of the above listed machine states, along with the calculated payload, may be utilized in alternative embodiments in the practice of the present invention. Calculations for the listed machine states are as hereinafter described.

The microprocessor 30 determines the time span in each state for each individual loading cycle and the total time of each loading cycle to determine machine state 130. The microprocessor 30 processes the measured signals 134 to determine various values indicative of the machine energy expended during the DIG 132 portion of each loading cycle, including the bucket payload obtained during each loading cycle, the payload per unit dig energy for each loading cycle, the payload per unit cycle time for each loading cycle, the payload per unit dig time for each loading cycle, the payload per unit dig lift cylinder pressure during the DIG 132, the payload per unit tilt cylinder pressure during the DIG 132, the lift cylinder pressure variability during the DIG 132 portion of each loading cycle, the tilt cylinder pressure variability during the DIG 132 portion of each loading cycle and the average machine position during the DIG 132 portion of each cycle. The microprocessor 30 then stores this data in the internal memory for later retrieval and/or transfer to another external device via a download cable 118 and a connector 120. The microprocessor 30 receives the measured engine speed signal, torque converter speed signal, transmission direction signal, lift cylinder pressure signal, lift arm angle signal, tilt cylinder pressure signal, tilt lever angle signal, and machine X, Y, Z Global Positioning Signals. The microprocessor 30 processes the measured signals as shown in FIG. 4, and determines the machine's state of operation such as DIG 132, TRAVEL-FULL 13G, WAIT-FULL 140, DUMP 144, TRAVEL-EMPTY 148, and WAIT-EMPTY 152.

The DIG 132 portion of the cycle is determined by processing the above mentioned signals coupled into microprocessor 30 with the start of the DIG 132 cycle beginning when the following conditions are met:

- The machine's state flag is set to WAIT-EMPTY 152, or TRAVEL-EMPTY 148;
- The transmission direction signal indicates the machine is traveling in the forward direction;
- The bucket height is below a threshold value such as near the ground plane;
- The bucket floor angle is such that it is within defined dig position limits;
- The lift cylinder pressure exceeds a threshold pressure; and
- The engine speed signal changes in such a manner as to indicate a substantial load on the power train.

When these conditions are met, the machine's state flag is set to DIG 132. The DIG 132 portion of the cycle ends when TRAVEL-FULL 136 begins.

The start of the TRAVEL-FULL 136 portion of the cycle is determined by processing the transmission direction signal and the tilt lever angle signal. The tilt lever angle signal is processed to determine bucket tilt angle. The start of the TRAVEL-FULL 136 portion of the cycle begins when the machine's state flag is set to DIG 132, and the bucket tilt angle exceeds a preselected threshold value (indicating that the bucket 72 is at or nearing fully racked back position typical for a loaded bucket), and the transmission direction signal indicates machine travel is in the reverse direction, such as during backing out of a muckpile. When these conditions are met, the machine's state flag is set to TRAVEL-FULL 136. The TRAVEL-FULL 136 portion of the cycle ends when either the WAIT-FULL 140 portion of the cycle begins or the DUMP 144 portion of the cycle begins.

The start of the WAIT-FULL 140 cycle is determined by processing the lift arm angle signal and the engine speed signal. The lift arm angle signal is processed to determine relative bucket height as indicated by the percent of lift cylinder rod travel. The start of the WAIT-FULL 140 cycle begins when the machine state flag is set to TRAVEL-FULL 136, the bucket height is above a preselected threshold value and the engine speed is below a threshold value (such as, near low idle). When these conditions are met, the machine state flag is set to WAIT-FULL 140. The WAIT-FULL 140 portion of the cycle ends when the DUMP 144 portion of the cycle begins.

The start of the DUMP 144 portion of the cycle is determined by processing the tilt lever angle. The tilt lever angle signal is processed to determine bucket tilt travel as indicated by processing the bucket tilt cylinder rod travel and bucket tilt cylinder rod velocity. The beginning of the DUMP 144 portion of the cycle is defined when the machine state flag is set to either TRAVEL-FULL 136 or WAIT-FULL 140 and either the bucket tilt cylinder rod velocity exceeds a preselected threshold value or the bucket tilt travel exceeds a preselected threshold value. When these conditions are met, the machine state flag is set to DUMP 144. The DUMP 144 portion of the cycle ends when the TRAVEL-EMPTY 148 portion of the cycle begins.

The start of the TRAVEL-EMPTY 148 portion of the cycle is determined by processing the transmission direction signal. The TRAVEL-EMPTY 148 portion of the cycle begins when the machine state flag is set to DUMP 144 and the transmission direction signal indicates machine travel is in the reverse direction. When these conditions are met, the machine state flag is set TRAVEL-EMPTY 148. The TRAVEL-EMPTY 148 portion of the cycle ends when the WAIT-EMPTY 152 portion of the cycle begins or when the next DIG 132 cycle begins, whichever comes first.

The WAIT-EMPTY 152 portion of the cycle is determined by processing a transmission direction signal and the engine speed signal. The WAIT-EMPTY 152 portion of the cycle begins when the machine state flag is set to TRAVEL-EMPTY 148, the transmission signal is neutral and the engine speed signal is below a preselected threshold value. When these conditions are met, the machine state flag is set to WAIT-EMPTY 152, the cycle ending when the next DIG 132 cycle begins.

The internal clock of the microprocessor 30 is used to determine the accumulated time spent in each state for each cycle with a total cycle determined by summing individual components such that:

$$\text{Total Cycle Time} = \text{Time of (DIG+TRAVEL-FULL+WAIT-FULL+DUMP+TRAVEL-EMPTY+WAIT-EMPTY)}$$

The individual time components in the total cycle time for each cycle are stored in the microprocessor internal memory.

The machine energy expended during the DIG 132 portion of the cycle is determined by summing the drive line energy, lift cylinder energy and tilt cylinder energy components such that:

$$\text{DIG Energy} = \text{Drive Line Energy During DIG} + \text{Lift Cylinder Energy During DIG} + \text{Tilt Cylinder Energy During DIG}.$$

The drive line energy during DIG 132 is energy delivered to the wheels 71 while the machine is engaged with the material in the muckpile. Drive line energy during DIG 132 is determined by integrating the incremental shaft work for a shaft 60 connecting the torque converter 58 to the transmission 64 such that:

$$\text{Drive line Energy During DIG} = f(\text{Incremental Torque Converter Output Shaft Work}).$$

Incremental Torque Converter Output Shaft Work ($f$) is defined as a product of torque converter output torque and incremental torque converter output shaft angular displacement such that:

$$\text{Incremental Torque Converter Output Shaft Work} = \text{Torque Converter Output Torque} * \text{Incremental Torque Converter Output Shaft Angular Displacement}.$$

The torque converter output torque is determined using the torque converter speed ratio and a torque converter performance table. The table is unique to the specific torque converter design and tabulates converter output torque for a given torque converter speed ratio. The microprocessor 30 processes the engine speed signal and the torque converter speed signal to determine the torque converter speed ratio. Torque converter speed ratio is defined as torque converter output speed divided by torque converter input speed, i.e. engine speed, such that:

$$\text{Torque Converter Speed Ratio} = \text{Torque Converter Speed} / \text{Engine Speed}.$$

A table lookup procedure and a linear interpolation technique is used to calculate torque converter output torque from the torque converter speed ratio such that:

$$\text{Torque Converter Output Torque} = \text{Table Value corresponding to the torque converter speed ratio for the Torque Converter being used}.$$

The microprocessor 30 processes the torque converter output speed signal to determine incremental angular displacement using the equation:

Incremental Torque Converter Output Shaft Angular Displacement=(Current Angular Velocity+Previous Angular Velocity)/ 2*Δt , where Δt is the lapsed time between the current and previous readings.

The lift cylinder energy during DIG 132 is energy delivered by the lift cylinder 74 to the bucket 72 while the machine is in the DIG 132 state. The lift cylinder energy during DIG 132 is determined by integrating incremental lift cylinder work such that:

Lift Cylinder Energy During DIG=∫(Incremental Lift Cylinder Work), where lift cylinder work is a product of the lift cylinder force and the incremental lift cylinder rod displacement and where:

Incremental lift cylinder work=lift cylinder force*incremental lift cylinder rod displacement.

The microprocessor 30 processes the lift cylinder signal to determine lift cylinder force. Lift cylinder force can be rigorously defined as the product of lift cylinder head end pressure and lift cylinder head end area minus the product of lift cylinder rod end pressure and lift cylinder rod end area, minus lift cylinder friction force. For the present invention, the lift cylinder force is approximated by:

Lift Cylinder Force=Lift Cylinder Head End Pressure*Lift Cylinder Head End Area.

In an alternative embodiment, it may be advantageous to also include the contribution of the lift cylinder rod end pressure into the Lift Cylinder Force calculation.

The microprocessor 30 processes the lift arm angle signal to determine lift cylinder rod displacement. Incremental lift cylinder rod displacement is determined by subtracting the current and previous lift cylinder rod displacement values such that: Incremental Lift Cylinder Rod Displacement= Current Lift Cylinder Rod Displacement−Previous Lift Cylinder Rod Displacement.

The tilt cylinder energy during DIG 132 is the energy delivered by the tilt cylinder 80 to the bucket 72 while the machine is in the DIG 132 state. The tilt cylinder energy during DIG 132 is determined by integrating incremental tilt cylinder work such that:

Tilt Cylinder Energy During DIG=∫(Incremental Tilt Cylinder Work)

where the incremental tilt cylinder work is a product of tilt cylinder force and incremental tilt cylinder rod displacement such that:

Incremental Tilt Cylinder Work=Tilt Cylinder Force*Incremental Tilt Cylinder Rod Displacement.

The microprocessor 30 samples the tilt cylinder pressure signal and determines tilt cylinder force. Similar to lift cylinder force, tilt cylinder force is the product of tilt cylinder head end pressure and tilt cylinder head end area minus the product of tilt cylinder rod end pressure and tilt cylinder rod end area minus tilt cylinder friction force, but may be approximated using only the head end pressure.

Further, microprocessor 30 processes the tilt lever angle signal to determine tilt cylinder rod displacement. Incremental tilt cylinder rod displacement is determined by subtracting the current and previous tilt cylinder rod displacement values such that:

Incremental Tilt Cylinder Rod Displacement=Current Tilt Cylinder Rod Displacement−Previous Tilt Cylinder Rod Displacement.

The microprocessor 30 performs the integrations necessary with the DIG energy components using the backward rectangle method. The DIG energy components for each bucket loading cycle are stored in the microprocessor internal memory.

During the TRAVEL-FULL 136 portion of each cycle the payload obtained During DIG 132 by bucket 72 is determined by processing the lift cylinder pressure signal and the lift arm angle signal as more fully described in U.S. Pat. No. 4,919,222, entitled DYNAMIC PAYLOAD MONITOR. A signal representing the bucket payload is then stored in the microprocessor internal memory for that cycle.

The average lift cylinder pressure during the DIG 132 portion of each cycle is determined by processing the lift cylinder pressure signal when the machine state flag is set to DIG 132. Various analog signals are digitally sampled and stored at predetermined consecutive intervals, each sampled signal being alternatively referred to herein as "samples" or "readings". The average lift cylinder pressure is determined by summing consecutive readings and dividing the total by the number of values read such that:

Average Lift Cylinder Pressure During DIG=Σ(Lift Cylinder Pressure Readings)/total Number of Readings.

The lift cylinder pressure variability during the DIG 132 portion of each cycle is calculated by summing the absolute value of the differences between consecutive readings such that:

Lift Cylinder Pressure Variability=Σ[ABS (Present Lift Cylinder Pressure Reading Previous−Lift Cylinder Pressure Reading)].

The average tilt cylinder pressure during the DIG 132 portion of each cycle is determined by summing consecutive tilt cylinder pressure readings while the machine state flag is set to DIG 132, and dividing the total by the number of values read such that:

Average Tilt Cylinder Pressure During DIG=Σ(Tilt Cylinder Pressure Readings)/total Number of Readings.

The tilt cylinder pressure variability during the DIG 132 portion of each cycle is calculated by summing the absolute value of the difference between consecutive readings such that:

Tilt Cylinder Pressure Variability=Σ[ABS (Present Tilt Cylinder Pressure Readings Previous−Tilt Cylinder Pressure Reading)].

An alternative means of determining both lift and tilt cylinder pressure variability is to compute the standard deviation of the pressure signal such that:

Cylinder Pressure Variability=SQRT[Σ(Present Cylinder Pressure Reading−Average Cylinder Pressure Reading)$^2$]/total Number of Readings.

The average lift/tilt cylinder pressure values and the lift/tilt cylinder pressure variability values obtained during the DIG 132 portion of each cycle are then stored in the microprocessor internal memory.

Utilizing the Global Positioning System (GPS), the average received position of the loading machine during the DIG 132 portion of each cycle is determined by processing the X,Y,Z machine position signals when the machine flag is set to DIG 132. The average position is determined by summing consecutive readings and dividing the total by the number of values read where:

Average X Position=Σ(X position Readings)/total Number of Readings, and

Average Y Position=Σ(Y Position Readings)/total Number of Readings, and

Average Z Position=Σ(Z Position Readings)/total Number of Readings.

The average received position values are then stored in the microprocessor internal memory.

The diggability ratios/indices utilized in determining the viability of the blast design 14 are determined from the data derived above and stored in the microprocessor internal memory. These indices consist of Payload per Unit Dig Energy, Payload per Unit Cycle Time, Payload per Unit Dig Time, Payload per Unit Lift Cylinder Pressure During Dig, and Payload per Unit Tilt Cylinder Pressure During Dig. The ratios are defined as;

Payload per Unit Dig Energy=Payload/Energy;

Payload per Unit Cycle Time=Payload/Total Cycle Time;

Payload per Unit Dig Time=Payload/Dig Time;

Payload per Unit Lift Cylinder Pressure During Dig=Payload/Average Lift Cylinder Pressure During Dig; and Payload per Unit Tilt Cylinder Pressure During Dig=Payload/Average Tilt Cylinder Pressure During Dig.

The data thus stored in the microprocessor memory can be utilized to ascertain the diggability ratios/indices. One method is to process the data after each loading cycle is complete with the onboard Amicroprocessor 30 providing calculation of the indices. Alternatively, means is provided via a download cable 118 and a connector 120 to transfer the data to a different (external) microprocessor device for batch processing of the parameters to provide the required indices.

It is within the purview of the present invention that other work machines with different linkage and power train configurations may be used by compensating for the differences thereof. Anticipated applicable machine types include excavators, front shovels, backhoe loaders and any machine from which the required parameters for calculating diggability indices during the diggability cycle may be obtained.

Other aspects, objects, and advantages of the invention can be obtained from a study of the drawings, the disclosure, and the appended claims.

What is claimed is:

1. An apparatus for dynamically determining the efficiency of blast design parameters using muckpile condition at a mine site from measured machine loader characteristics, said loader including a drive train having an engine coupled through a torque converter and a transmission to a set of drive wheels and a digging apparatus including a bucket, comprising:

a payload sensor coupled to the digging apparatus and operative to determine a parameter indicative of a payload carried by said bucket during an operational loading cycle and produce an output signal indicative thereof;

A plurality of sensors coupled to the drive train components and to the digging apparatus and operative to measure operational parameters relating to an operational loading cycle of the loader, each sensor producing an output signal thereof; and a microprocessor coupled to receive the payload and operational output signals and process the signals to produce diggability ratio indices indicative of the blast design parameter efficiency.

2. The apparatus of claim 1, wherein the operational loading cycle of the loader includes a DIG segment, a TRAVEL-FULL segment, a WAIT-FULL segment, a DUMP segment, a TRAVEL-EMPTY segment, and a WAIT-EMPTY segment, each segment taking a period of time to complete, the times being mutually exclusive, and coupled into the microprocessor; and the microprocessor operative to sum said mutually exclusive times to produce a total cycle time, and further operative to produce a Payload per Unit Cycle Time diggability ratio where:

Payload per Unit Cycle Time=Payload/Total Cycle Time which diggability ratio is indicative of the blast design parameter efficiency.

3. The apparatus of claim 2, wherein the plurality of sensors coupled to the drive train provide signals indicative of engine speed, torque converter speed, and transmission state, and the sensors coupled to the digging apparatus provide signals indicative of tilt lever angle, tilt cylinder pressure, lift arm angle, and lift cylinder pressure.

4. The apparatus of claim 3, wherein the microprocessor is operative to calculate the machine energy expended during the DIG segment of the operational loading cycle by deriving a Drive line Energy signal, a Lift Cylinder Energy signal, and a Tilt Cylinder Energy signal and summing the derived signals in accordance with the formula:

DIG Energy=Drive line Energy During DIG+Lift Cylinder Energy During DIG+Tilt Cylinder Energy During DIG the microprocessor operative to produce a Payload per Unit DIG energy diggability ratio where:

Payload per Unit DIG Energy=Payload/DIG Energy which diggability ratio is indicative of the blast design parameter efficiency.

5. The apparatus of claim 3, wherein the microprocessor is operative to use the Payload and the DIG segment time to produce a Payload per Unit DIG Time diggability ratio where:

Payload per Unit DIG Time=Payload/DIG Time which diggability ratio is indicative of the blast design parameter efficiency.

6. The apparatus of claim 3, wherein the microprocessor is operative to calculate an Average Lift Cylinder Pressure during DIG by summing sampled Lift Cylinder Pressure signals obtained during successive DIG segments and dividing by the number of samples thus obtained according to the formula:

Average Lift Cylinder Pressure during DIG=(Lift Cylinder Pressure samples)/total number of samples summed the microprocessor further operative to use the Payload and the Average Lift Cylinder Pressure during DIG to produce a Payload per Unit Lift Cylinder Pressure during DIG diggability ratio where:

Payload per Unit Lift Cylinder Pressure during DIG=Payload/Average Lift Cylinder Pressure during DIG;

which diggability ratio is indicative of the blast design parameter efficiency.

7. The apparatus of claim 3, wherein the microprocessor is operative to calculate an Average Tilt Cylinder Pressure during DIG by summing sampled Tilt Cylinder Pressure signals obtained during successive DIG segments and dividing by the number of samples thus obtained according to the formula:

Average Tilt Cylinder Pressure during DIG=Σ(Tilt Cylinder Pressure samples)/total number of samples summed the microprocessor is further operative to use the Payload and the Average Tilt Cylinder Pressure during DIG to produce a Payload per Unit Tilt Cylinder Pressure during DIG diggability ratio where:

Payload per Unit Tilt Cylinder Pressure during DIG=Payload/Average Tilt Cylinder Pressure during DIG;

which diggability ratio is indicative of the blast design parameter efficiency.

8. The apparatus of claim 1, further including a Global Positioning System (GPS) receiver connected to the machine loader for receiving X,Y,Z coordinate information relative to the position of the machine loader with respect to the mine site;
the GPS receiver having an output signal coupled to the microprocessor for loading the coordinate information therein; and
the microprocessor operative to generate a database relating the X,Y,Z coordinate position of the machine loader to the mine site with respect to successive operational loading cycles.

9. The apparatus of claim 8, further including a display unit coupled to the microprocessor and operative to receive signals from the database and display the relative position of the machine loader with respect to the mine site for a given point in time.

10. A method for dynamically determining the efficiency of blast design parameters at a mine site from measured machine loader characteristics, said loader including a drive train having an engine coupled through a torque converter and a transmission to a set of drive wheels and a digging apparatus including a bucket, including the steps of:
sensing a parameter indicative of a payload carried by said bucket during an operational loading cycle and producing an output signal indicative thereof;
measuring operational parameters relating to an operational loading cycle of the loader and producing an output signal representative thereof; and
coupling the payload and operational output signals into a microprocessor and processing the signals to produce diggability ratio indices indicative of the blast design parameter efficiency.

11. The method of claim 10, wherein the operational loading cycle of the loader includes a DIG segment, a TRAVEL-FULL segment, a WAIT-FULL segment, a DUMP segment, a TRAVEL-EMPTY segment, and a WAIT-EMPTY segment, each segment taking a separate and distinct period of time to complete, and coupling a signal representative of each segment time into the microprocessor; including the step of summing, in the microprocessor, said mutually exclusive times and producing a total cycle time, and further producing a Payload per Unit Cycle Time diggability ratio where:

Payload per Unit Cycle Time=Payload/Total Cycle Time which diggability ratio is indicative of the blast design parameter efficiency.

12. The method of claim 11, including sensing parameters relating to engine speed, torque converter speed, and transmission state, and coupling same into the microprocessor for developing therein signals indicative of tilt lever angle, tilt cylinder pressure, lift arm angle, and lift cylinder pressure.

13. The method of claim 12, including calculating the machine energy expended during the DIG segment of the operational loading cycle by deriving a Driveline Energy signal, a Lift Cylinder Energy signal, and a Tilt Cylinder Energy signal and summing the derived signals in accordance with the formula:

DIG Energy=Drive line Energy During DIG+Lift Cylinder Energy During DIG+Tilt Cylinder Energy During DIG and thereafter producing a Payload per Unit DIG energy diggability ratio where:

Payload per Unit DIG Energy=Payload/DIG Energy which diggability ratio is indicative of the blast design parameter efficiency.

14. The method of claim 12, including the step of using the Payload and the DIG segment time and producing a Payload per Unit DIG Time diggability ratio where:

Payload per Unit DIG Time=Payload/DIG Time which diggability ratio is indicative of the blast design parameter efficiency.

15. The method of claim 12, including the step of calculating an Average Lift Cylinder Pressure during DIG by summing sampled Lift Cylinder Pressure signals obtained during successive DIG segments and dividing by the number of samples thus obtained according to the formula:

Average Lift Cylinder Pressure during DIG=Σ(Lift Cylinder Pressure samples)/total number of samples summed thereafter using the Payload and the Average Lift Cylinder Pressure during DIG for producing a Payload per Unit Lift Cylinder Pressure during DIG diggability ratio where:

Payload per Unit Lift Cylinder Pressure during DIG=Payload/Average Lift Cylinder Pressure during DIG;

which diggability ratio is indicative of the blast design parameter efficiency.

16. The method of claim 12, including the step of calculating an Average Tilt Cylinder Pressure during DIG by summing sampled Tilt Cylinder Pressure signals obtained during successive DIG segments and dividing by the number of samples thus obtained according to the formula:

Average Tilt Cylinder Pressure during DIG=(Tilt Cylinder Pressure signals)/total number of samples summed the microprocessor is further operative to use the Payload and the Average Tilt Cylinder Pressure during DIG to produce a Payload per Unit Tilt Cylinder Pressure during DIG diggability ratio where:

Payload per Unit Tilt Cylinder Pressure during DIG=Payload/Average Tilt Cylinder Pressure during DIG;

which diggability ratio is indicative of the blast design parameter efficiency.

* * * * *